UNITED STATES PATENT OFFICE.

A. MONNIER, OF PHILADELPHIA, PENNSYLVANIA.

IMPROVEMENT IN SEPARATING COPPER, NICKEL, AND COBALT.

Specification forming part of Letters Patent No. 40,116, dated September 29, 1863.

*To all whom it may concern:*

Be it known that I, ALFRED MONNIER, of the city of Philadelphia, in the county of Philadelphia and State of Pennsylvania, have invented a new and Improved Process of Treating Sulphates of Copper, Cobalt, and Nickel for Obtaining the Chlorides of those Metals; and I do hereby declare that the following is a full, clear, and exact description of the same.

My invention is designed to facilitate the process of separating the metals copper, nickel, and cobalt, more especially with a view to the obtaining of nickel in its metallic state and the oxide of cobalt. To effect this the ores have been commonly first treated to obtain the sulphates of the metals.

Heretofore it has been customary for the separation of two or more sulphates to use the difference of temperature or concentration of a solution and let crystalize; but the sulphates of copper, cobalt, and nickel, the separation of which cannot be effected by crystallization, nor by the usual mode of separation employed for those metals, have been precipitated by the addition of lime or other reagents, and then dissolved in muriatic or other acid, so as to obtain those metals as chlorides, in which form they are easily separated.

The object of my invention is to obtain the chlorides of those metals in a more economical manner; and to this end it consists in the treatment of the sulphates by the use of chloride of sodium or other compounds of chlorine—such as chloride of potassium, chloride of calcium, chloride of magnesium, chloride of strontium, or the hypochlorites of lime, potassa, or soda—but I prefer the chloride of sodium, because of its cheapness and the readiness with which it can be obtained. The other chlorides or hypochlorites are to be used in the same manner to accomplish the object in view, as will now be described.

To obtain the chloride of copper, cobalt, and nickel from a sulphate solution, I add to such solution either crystals or a solution of chloride of sodium in quantity a little in excess of what is necessary to constitute equivalent for equivalent. The introduction of a jet of steam into the solution accelerates the reaction. I next concentrate the liquor by evaporation to about 30° Baumé, and allow it to crystalize to obtain the sulphate of soda. The copper, cobalt, and nickel are then obtained by precipitation from the mother-liquor in the usual way.

Instead of the sulphates being treated in solution, as above described, they may be treated in crystalline form by the use of a chloride, in similar quantity to that above specified, in a metallic pan over a fire or in a reverberatory furnace.

The advantage of my improved process is that a sulphate solution of copper, cobalt, and nickel can be worked, with the addition of chloride of sodium or other compound of chlorine, without precipitating and redissolving the metals, saving the time and acids and much labor.

What I claim as my invention, and desire to secure by Letters Patent, is—

The treatment of sulphates of copper, cobalt, and nickel by means of chloride of sodium or other compound of chlorine, substantially as and for the purpose herein set forth.

ALFRED MONNIER.

Witnesses:
ALEXR. MUCKLÈ,
JAMES. McCAHEN.